(12) United States Patent
Takekawa et al.

(10) Patent No.: US 11,466,642 B2
(45) Date of Patent: Oct. 11, 2022

(54) GASKET MATERIAL

(71) Applicant: NOK CORPORATION, Tokyo (JP)

(72) Inventors: Daiki Takekawa, Kanagawa (JP); Isao Watanabe, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 238 days.

(21) Appl. No.: 16/760,478

(22) PCT Filed: Oct. 16, 2018

(86) PCT No.: PCT/JP2018/038505
§ 371 (c)(1),
(2) Date: Apr. 30, 2020

(87) PCT Pub. No.: WO2019/093081
PCT Pub. Date: May 16, 2019

(65) Prior Publication Data
US 2021/0189996 A1    Jun. 24, 2021

(30) Foreign Application Priority Data
Nov. 7, 2017    (JP) .............................. JP2017-214623

(51) Int. Cl.
*F02F 11/00* (2006.01)
*F16J 15/08* (2006.01)
*B32B 15/06* (2006.01)

(52) U.S. Cl.
CPC ............. *F02F 11/002* (2013.01); *F16J 15/08* (2013.01); *B32B 15/06* (2013.01); *B32B 2581/00* (2013.01); *Y10T 428/215* (2015.01)

(58) Field of Classification Search
CPC . B32B 2581/00; B32B 15/06; Y10T 428/215; F16J 15/08; F16J 15/0825; F02F 11/002
See application file for complete search history.

(56) References Cited

U.S. PATENT DOCUMENTS

| | | | |
|---|---|---|---|
| 5,510,191 A | 4/1996 | Higashira et al. | |
| 5,587,413 A * | 12/1996 | Enokida | C09K 3/1009 560/33 |
| 5,904,965 A * | 5/1999 | Noel | B65D 39/0058 428/319.3 |
| 6,221,451 B1 * | 4/2001 | Lauer | B65D 39/0011 428/319.3 |
| 6,416,840 B1 * | 7/2002 | Miyamori | C08K 7/02 524/544 |
| 6,730,385 B1 * | 5/2004 | Tanaka | C08J 5/124 156/335 |
| 10,280,869 B2 | 5/2019 | Tanaka et al. | |
| 2003/0096904 A1 * | 5/2003 | Hakuta | C09D 123/16 524/588 |
| 2007/0021565 A1 * | 1/2007 | Horie | C08L 23/16 525/192 |
| 2010/0261004 A1 * | 10/2010 | Higashira | C09K 3/10 428/327 |
| 2011/0040038 A1 * | 2/2011 | Arai | C08F 212/36 525/185 |
| 2013/0009365 A1 * | 1/2013 | Kabutoya | B32B 27/322 277/654 |
| 2013/0202838 A1 * | 8/2013 | Campbell | C08K 3/04 525/193 |
| 2014/0191477 A1 | 7/2014 | Kobayashi et al. | |
| 2015/0035236 A1 * | 2/2015 | Tsuda | F16J 15/3204 525/228 |
| 2015/0354706 A1 * | 12/2015 | Yamanaka | C08K 3/34 277/549 |
| 2016/0177045 A1 * | 6/2016 | Krist | C08L 23/08 521/149 |
| 2016/0195188 A1 * | 7/2016 | Tanaka | B32B 27/28 277/592 |
| 2016/0326272 A1 | 11/2016 | Obrecht | |
| 2016/0369742 A1 | 12/2016 | Tanaka et al. | |
| 2019/0022986 A1 * | 1/2019 | Nemoto | C08L 83/04 |
| 2020/0024765 A1 * | 1/2020 | Noguchi | C25D 11/16 |
| 2020/0216636 A1 * | 7/2020 | Yagi | B32B 15/18 |

FOREIGN PATENT DOCUMENTS

| | | | |
|---|---|---|---|
| CN | 102432929 | 5/2012 | |
| EP | 1 588 839 | 10/2005 | |
| EP | 3015746 A1 * | 5/2016 | ............. B32B 15/06 |
| JP | 46-33851 A | 10/1971 | |
| JP | 7-165953 A | 6/1995 | |
| JP | 2000-141538 | 5/2000 | |
| JP | 2002-37962 A | 2/2002 | |
| JP | 2005-28816 A | 2/2005 | |
| JP | 2006-37044 A | 2/2006 | |
| JP | 2017-504695 A | 2/2017 | |
| WO | 2013/038835 A1 | 3/2013 | |
| WO | 2014/126240 A1 | 8/2014 | |
| WO | 2014/208113 A1 | 12/2014 | |

OTHER PUBLICATIONS

International Search Report issued in International Patent Application No. PCT/JP2018/038505, dated Dec. 4, 2018, English translation.

International Preliminary Report on Patentability issued in International Patent Application No. PCT/JP2018/038505, dated May 12, 2020, English translation.

* cited by examiner

*Primary Examiner* — Eugene G Byrd
(74) *Attorney, Agent, or Firm* — Greenblum & Bernstein, P.L.C.

(57) ABSTRACT

A gasket material, in which a crosslinked rubber layer compounding 30 to 200 parts by weight of titanium oxide based on 100 parts by weight of NBR or hydrogenated NBR is formed on a metal plate, improves blister resistance, and thus exhibits an excellent effect of preventing rubber peeling of the gasket in the engine and leading to an improvement of engine malfunction. Further, the use of NBR or hydrogenated NBR results in an advantage of low cost relative to that of fluororubber. Therefore, the gasket material of the present invention is effectively used as a cylinder head gasket.

3 Claims, No Drawings

GASKET MATERIAL

TECHNICAL FIELD

The present invention relates to a gasket material. More particularly, the present invention relates to a gasket material with improved blister resistance.

BACKGROUND ART

A cylinder head gasket is parts in which rubber is laminated on a metal plate and which seals between the engine and the block. When the gasket is used, water resistance is required because the engine cooling water is brought into contact with the gasket. Blisters are formed if the water resistance is low.

If blisters are formed in the engine, the blistered rubber material may be peeled. If the peeled rubber material enters the cooling system, troubles occur in the cooling system, leading to engine failure.

As a method for improving blister properties, the amount of a filler to be compounded can be increased. Generally used fillers are calcium carbonate, talc, clay, silica, mica, wollastonite, and the like; however, none of them satisfy blister resistance, as shown in the results of Comparative Examples, described later. If the filler is excessively filled, the rubber hardness increases to deteriorate the sealing properties.

Further, as a rubber material, fluororubber has excellent blister resistance, but has a disadvantage of high cost.

Patent Document 1 discloses a rubber-metal laminated gasket in which a surface treatment agent layer, an adhesive layer, and a rubber layer are sequentially laminated on a metal plate, wherein a fluorine-free titanium compound—alumina mixture is used as the surface treatment layer to improve LLC resistance under high temperature conditions.

PRIOR ART DOCUMENTS

Patent Documents

Patent Document 1: WO 2014/208113 A1
Patent Document 2: JP-A-7-165953

EMBODIMENTS FOR CARRYING OUT THE INVENTION

Outline of the Invention

Problem to be Solved by the Invention

An object of the present invention is to provide a gasket material having excellent blister resistance and effectively used as a cylinder head gasket or the like.

Means for Solving the Problem

The above object of the present invention can be achieved by a gasket material in which a crosslinked rubber layer compounding 30 to 200 parts by weight of titanium oxide based on 100 parts by weight of NBR or hydrogenated NBR is formed on a metal plate.

Effect of the Invention

The gasket material according to the present invention has improved blister resistance, and thus exhibits an excellent effect of preventing rubber peeling of the gasket in the engine and leading to an improvement of engine malfunction. Further, the use of NBR or hydrogenated NBR results in an advantage of low cost relative to that of fluororubber. Therefore, the gasket material of the present invention is effectively used as a cylinder head gasket.

EMBODIMENTS FOR CARRYING OUT THE INVENTION

As the metal plate, mild steel plate, stainless steel plate, aluminum plate, aluminum die cast plate, or the like is used. Examples of the stainless steel plate include SUS301, SUS301H, SUS304, SUS430, and the like. For gasket applications, the plate thickness is generally about 0.1 to 2 mm. In this case, the metal plate is preferably used after surface roughening treatment and/or alkaline degreasing treatment.

A primer layer is preferably formed on the metallic sheet. The primer layer includes, for example, inorganic films such as Ti/Al films, zinc phosphate films, iron phosphate films, coating-type chromate films, films of compounds of metals such as vanadium, zirconium, titanium, molybdenum, tungsten, manganese, zinc, cerium, etc., particularly oxides of these metals, and organic films such as silanes, phenol resin, epoxy resin, polyurethane, etc. Generally, commercially available chemical solutions or well known art can be used as such. Preferably, a primer layer containing an organometallic compound having at least one each of chelate ring and alkoxy group, a primer layer further containing a metal oxide or silica in addition to the organometallic compound, and more preferably, a primer layer further containing a hydrolysis condensation product of an amino group-containing alkoxy silane and a vinyl group-containing alkoxysilane in addition to the afore-mentioned primer layer-forming components can be used. The hydrolysis condensation product can be used also alone.

The organometallic compound includes, for example, organoaluminum compounds such as ethylacetate aluminum diisopropylate, aluminum tris(ethyl acetoacetate), aluminum-mono-acetylacetonate-bis(ethyl acetoacetate), aluminum tris(acetylacetate); organotitanium compounds such as isopropoxytitanium bis(ethyl acetoacetate), 1,3-propanedioxytitanium bis(ethyl acetoacetate), diisopropoxytitanium bis(acetylacetonate), titanium tetra(acetylacetonate); organozirconium compounds such as di-n-butoxyzirconium bis(acetylacetonate), di-n-butoxyzirconium bis(ethyl acetoacetate), and preferably organotitanium compounds composed of chelate ring(s) and alkoxy group(s), represented by the following general formulae:

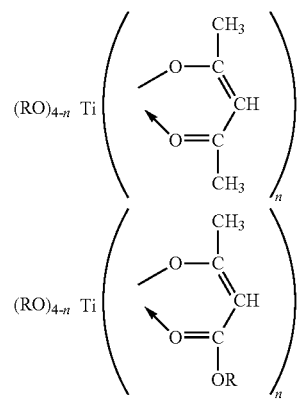

where R: a lower alkyl group such as $CH_3$, $C_2H_5$, n-$C_3H_7$, i-$C_3H_7$, n-$C_4H_9$, i-$C_4H_9$ n: an integer of 1-4.

The surface treating agent forming the primer layer is applied on to the surface of a metal plate by dipping, spraying, brush coating, roll coating, or the like so that the coating amount (coating weight) on one surface is 30 to 1,000 mg/m², preferably 100 to 1,000 mg/m², and then dried at room temperature or by hot air, followed by calcination at 100 to 250° C. for 1 to 20 minutes.

On to the primer layer of the surface treating agent applied on to the metal plate and dried, a resin-based vulcanizing adhesive, such as thermosetting phenolic resin, epoxy resin, is applied as an adhesive for rubber. The thermosetting phenolic resin can be any thermosetting phenolic resin, such as cresol novolac type phenolic resin, cresol resol type phenolic resin, or alkyl-modified phenolic resin. Moreover, as the epoxy resin, cresol novolac type epoxy resin is preferably used. In this case, bisphenol novolac type phenolic resin is used as a curing agent, and an imidazole compound is used as a curing catalyst.

Such a resin-based vulcanizing adhesive is generally prepared as an organic solvent solution having a component concentration of about 1 to 5 wt. % using an alcohol-based organic solvent, such as methanol, ethanol, or isopropanol, or a ketone-based organic solvent, such as acetone, methyl ethyl ketone, or methyl isobutyl ketone, singly or as a mixed solvent thereof. The vulcanizing adhesive is applied by the same coating method as for the surface treating agent so that the coating weight (coating amount) on one surface is 100 to 2,500 mg/m², and dried at room temperature or by hot air, followed by calcination at 100 to 250° C. for 1 to 20 minutes.

An unvulcanized rubber compound is applied as an organic solvent solution of the rubber compound on to both surfaces of the vulcanizing adhesive layer thus formed, so that the unvulcanized rubber compound can form on both sides vulcanizate layers having a coating film thickness on each side of about 5 to 120 μm.

The nitrile rubber (NBR) can be used also as a compound comprising a sulfur-based vulcanizing agent, such as sulfur, tetramethylthiurammonosulfide, or tetramethylthiuramdisulfide; however, the nitrile rubber is preferably used as an unvulcanized nitrile rubber compound comprising an organic peroxide as a crosslinking agent. Formulation examples of such peroxide-crosslinkable unvulcanized nitrile rubber compound are show below.

(Formulation Example I)

| | |
|---|---|
| NBR (N-235S, produced by JSR Corporation) | 100 Parts by weight |
| SRF carbon black | 80 Parts by weight |
| Zinc oxide | 5 Parts by weight |
| Antioxidant (Nocrac 224, produced by Ouchi Shinko Chemical Industrial Co., Ltd.) | 2 Parts by weight |
| Triallyl isocyanurate | 2 Parts by weight |
| 1,3-bis(tert-butylperoxy)isopropyl benzene | 2.5 Parts by weight |
| Plasticizers (Vukanol OT, produced by Bayer) | 5 Parts by weight |

(Formulation Example II)

| | |
|---|---|
| NBR (N-237, middle-high nitrile, produced by JSR Corporation) | 100 Parts by weight |
| HAF carbon black | 80 Parts by weight |
| Zinc oxide | 5 Parts by weight |
| Stearic acid | 1 Part by weight |
| Antioxidant (ODA-NS produced by Ouchi Shinko Chemical Industrial Co., Ltd.) | 1 Part by weight |
| Organic peroxide (Perhexa 25B, produced by NOF Corporation) | 6 Parts by weight |
| N,N-m-phenylenedimaleimide | 1 Part by weight |

The coated unvulcanized rubber layers are dried at room temperature to about 100° C. for about 1 to 15 minutes to evaporate off alcohols such as methanol, ethanol, ketones such as methyl ethyl ketone, methyl isobutyl ketone, aromatic hydrocarbons such as toluene, xylene, or a mixture thereof, used as an organic solvent, followed by vulcanization by heating at about 150 to 230° C. for about 0.5 to 30 minutes. On this occasion, the vulcanization is performed while pressurizing, if necessary.

As the hydrogenated NBR used in the same manner as NBR, those having any degree of hydrogenation are used. Hydrogenated NBR is crosslinked with an organic peroxide.

Such (hydrogenated) NBR is compounded with 30 to 200 parts by weight, preferably 70 to 150 parts by weight, of titanium oxide based on 100 parts by weight of the (hydrogenated) NBR. The average particle diameter of titanium oxide is not particularly limited, and is about 0.15 to 0.30 μm, for example.

If the compounding ratio is less than this range, the effect of improving blister resistance is not obtained. In contrast, if the compounding ratio is greater than this range, the rubber hardness becomes too high, and the sealing properties are deteriorated. However, the use of other fillers, such as calcium carbonate and silica, is allowed as long as the object of the present invention is not impaired. In order to ensure the sealing properties, the D hardness is preferably 65 or less.

Therefore, the blister resistance of a cylinder head gasket or the like can be improved by compounding a specific ratio of titanium oxide. As a result, there is no rubber peeling from the gasket in the engine, and the malfunction is improved.

Titanium oxide-containing (hydrogenated) NBR is formed on a metal plate as a crosslinked rubber layer. If it is necessary to prevent adhesion, an adhesion preventing agent can be also applied on to the surface thereof.

The adhesion preventing agent is used to prevent sticking between rubbers themselves or between the rubber and the metal. Any adhesion preventing agent can be used, so far as it can form a film layer on the vulcanized rubber layers, and includes, for example, silicone series, fluorine series, graphite series, wax series such as amides, paraffins, polyolefin series, or polybutadiene series, and preferably an adhesion preventing agent comprising a dispersion in an organic solvent of liquid 1,2-polybutadiene hydroxyl group-containing material, 1,2-polybutadiene isocyanate group-containing material, and polyolefin-based resin is used (Patent Document 2).

EXAMPLES

The following describes the present invention with reference to Examples.

Example 1

A Ti/Al-based primer (Ti compound: ORGATIX TC-100, produced by Matsumoto Fine Chemical Co., Ltd., and Al compound: AS-520-A, produced by Nissan Chemical Corporation) was applied on to both sides of a degreased stainless steel plate (thickness: 0.2 mm) and baked at 200° C. for 10 minutes to form a lower primer layer. An adhesive mainly comprising epoxy resin was applied on to the lower primer layer and baked at 200° C. for 5 minutes to form a cover coat layer. A rubber paste coating liquid was applied on to the cover coat layer and vulcanized at 190° C. for 8 minutes to form a rubber layer. A coating liquid in which wax and graphite were dispersed was applied on to the rubber layer and baked at 200° C. for 5 minutes to form an adhesion preventing layer, thereby producing a gasket material.

The rubber paste coating liquid has the following formulation.

| | |
|---|---|
| Hydrogenated NBR (Therban 3446, produced by Lanxess) | 100 parts by weight |
| Carbon black (Seast G-S, produced by Tokai Carbon Co., Ltd.) | 85 parts by weight |
| Titanium oxide (TIPAQUE A-100, produced by ISHITIARA SANGYO KAISHA, LTD.) | 30 parts by weight |
| Stearic acid | 1 part by weight |
| Antiaging agent (Nocrac ODA, produced by Ouchi Shinko Chemical Industrial Co., Ltd.) | 2 parts by weight |
| Cross-linking agent (Taic, produced by Hitachi Chemical Company, Ltd.) | 2 parts by weight |
| Organic peroxide (Perbutyl P, produced by NOF Corporation) | 8 parts by weight |

The above components were kneaded with a kneader and an open roll, and the resulting kneaded product (composition) was dissolved and dispersed in methyl ethyl ketone, toluene, ethyl acetate, etc., to prepare a rubber paste coating liquid with a solid matters content of 20 wt. %.

The produced gasket material was evaluated and measured for each of the following items.

Blister Resistance Test:

The perforated (diameter: 4 mm) gasket material was fixed in a tubular body, and industrial water was flown from downward to upward at an internal pressure of 0.5 MPa at a water temperature of 95° C. for a test time of 48 hours. Then, none or yes of the formation of blisters in the gasket material perforated part was visually observed.

D Hardness Measurement:

A rubber sheet having a thickness of 2 mm obtained by vulcanizing the composition at 170° C. for 20 minutes was measured with a JIS D durometer corresponding to ISO 7619-1.

Example 2

In Example 1, the amount of titanium oxide was changed to 70 parts by weight.

Example 3

In Example 1, the amount of titanium oxide was changed to 100 parts by weight.

Example 4

In Example 1, the amount of titanium oxide was changed to 130 parts by weight.

Example 5

In Example 1, the amount of titanium oxide was changed to 150 parts by weight.

Example 6

In Example 1, the amount of titanium oxide was changed to 200 parts by weight.

Example 7

In the Example 3 where 100 parts by weight of amount of titanium oxide is used, the same amount (100 parts by weight) of JSR N237 (produced by JSR) was used, as the NBR.

Comparative Example 1

In Example 1, titanium oxide was not used.

Comparative Example 2

In Example 1, the amount of titanium oxide was changed to 15 parts by weight.

Comparative Example 3

In Example 1, the amount of titanium oxide was changed to 250 parts by weight.

Comparative Example 4

In Example 2, 80 parts by weight of calcium carbonate (Whiton SB, produced by Shiraishi Calcium Kaisha, Ltd.) was used in place of 70 parts by weight of titanium oxide.

Comparative Example 5

In Example 2, 80 parts by weight of clay (Dixie Clay, produced by Vanderbilt Co., Inc.) was used in place of 70 parts by weight of titanium oxide.

Comparative Example 6

In Example 2, 80 parts by weight of talc (Enstac 24, produced by Asada Milling Co., Ltd.) was used in place of 70 parts by weight of titanium oxide.

Comparative Example 7

In Example 2, 80 parts by weight of mica (Sanshin mica, produced by Sanshin Mining Ind. Co., Ltd.) was used in place of 70 parts by weight of titanium oxide.

Comparative Example 8

In Example 2, 80 parts by weight of wollastonite (NYAD 400, produced by NYCO) was used in place of 70 parts by weight of titanium oxide.

Comparative Example 9

In Example 1, 40 parts by weight of silica (Nipseal E74P, produced by Tosoh Silica Corporation) was used in place of 30 parts by weight of titanium oxide.

Following table below shows the results obtained in the above Examples and Comparative Examples.

TABLE

| Example | Formation of blisters | D hardness |
| --- | --- | --- |
| Example 1 | none | 51 |
| Example 2 | none | 53 |
| Example 3 | none | 54 |
| Example 4 | none | 60 |
| Example 5 | none | 62 |
| Example 6 | none | 65 |
| Example 7 | none | 52 |
| Comparative Example 1 | yes | 49 |
| Comparative Example 2 | yes | 50 |
| Comparative Example 3 | none | 67 |
| Comparative Example 4 | yes | 53 |
| Comparative Example 5 | yes | 53 |
| Comparative Example 6 | yes | 54 |
| Comparative Example 7 | yes | 54 |
| Comparative Example 8 | yes | 53 |
| Comparative Example 9 | yes | 61 |

The invention claimed is:

1. A gasket material in which a crosslinked rubber layer compounding 30 to 200 parts by weight of titanium oxide based on 100 parts by weight of NBR or hydrogenated NBR is formed on a metal plate.

2. The gasket material according to claim 1, having a D hardness measured with a J1S D durometer corresponding to ISO 7619-1 of 65 or less.

3. The gasket material according to claim 2, which is used as a cylinder head gasket.

* * * * *